United States Patent
Clegg et al.

(10) Patent No.: US 6,990,424 B2
(45) Date of Patent: Jan. 24, 2006

(54) METHOD TO PROVIDE EXTERNAL OBSERVABILITY WHEN EMBEDDED FIRMWARE DETECTS PREDEFINED CONDITIONS

(75) Inventors: Roger T. Clegg, Wichita, KS (US); Alan T. Pfeifer, Kechi, KS (US); Bonnie C. Mills, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 73 days.

(21) Appl. No.: 10/730,523

(22) Filed: Dec. 8, 2003

(65) Prior Publication Data
US 2005/0125189 A1 Jun. 9, 2005

(51) Int. Cl.
*G01M 19/00* (2006.01)
*G06F 19/00* (2006.01)
(52) U.S. Cl. ...................... 702/124; 702/118; 702/123; 714/712

(58) Field of Classification Search ................ 702/108, 702/118, 121, 122, 123, 124, 182; 714/39, 714/43, 712, 724
See application file for complete search history.

(56) References Cited

U.S. PATENT DOCUMENTS 5,923,673 A * 7/1999 Henrikson ................... 714/712
6,507,923 B1 * 1/2003 Wall et al. .................. 714/712

* cited by examiner

*Primary Examiner*—Bryan Bui
(74) *Attorney, Agent, or Firm*—Yee & Associates, P.C.

(57) ABSTRACT

A method and apparatus for generating a system specific test by providing sophisticated error tracking mechanisms to trigger on a specific system event. The present invention addresses the problem of monitoring network traffic and isolating a point of error at the testing stage. The present invention defines a specific system event to be monitored. A trigger is created in the host system and routed to the analyzer, wherein the trigger is used to allow the analyzer to capture information related to the specific system event. When a signal is received at the analyzer, the signal automatically triggers the analyzer to capture and store a predetermined amount of data related to the specific system event before and after the trigger is executed.

27 Claims, 5 Drawing Sheets

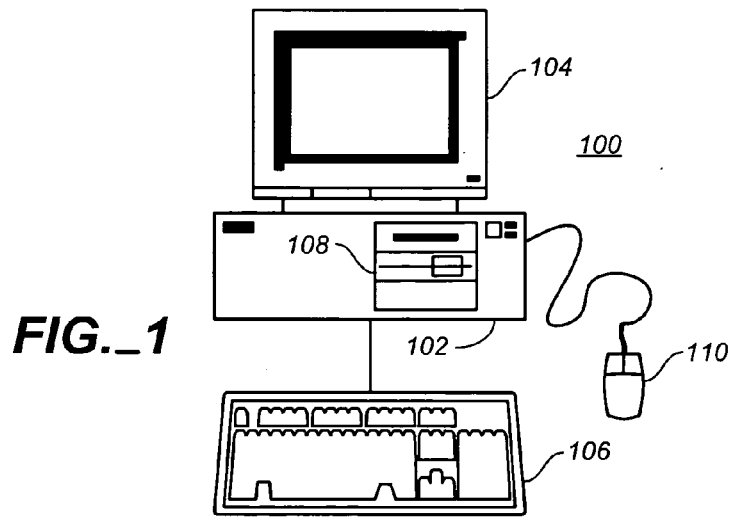
FIG._1
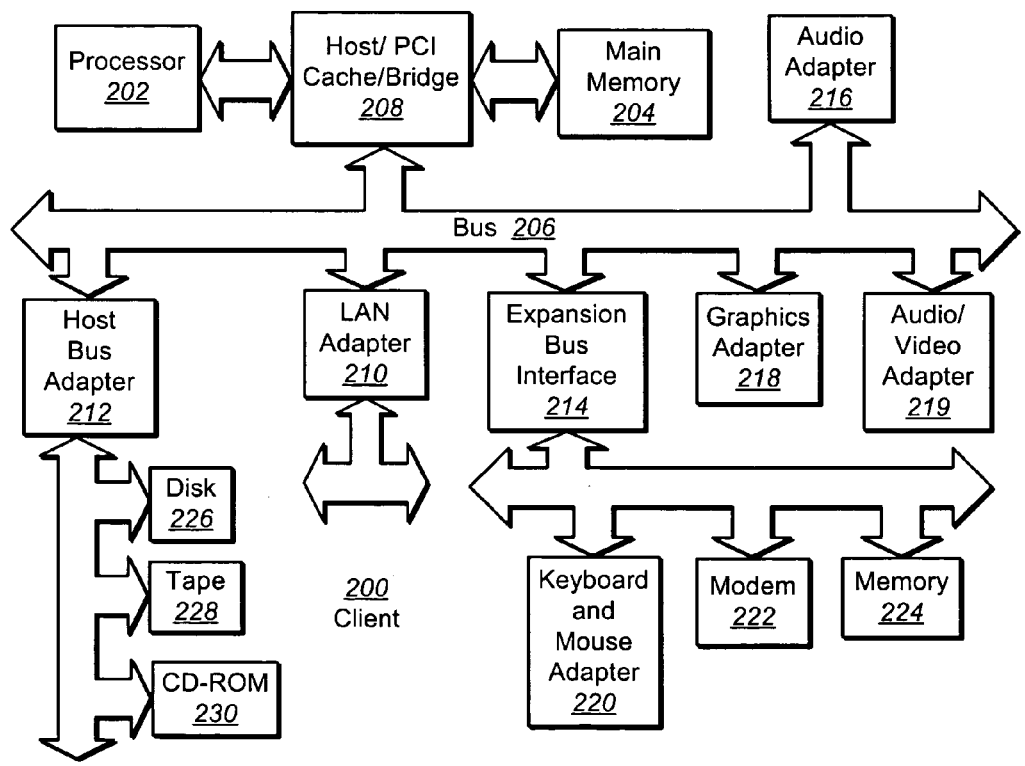
FIG._2

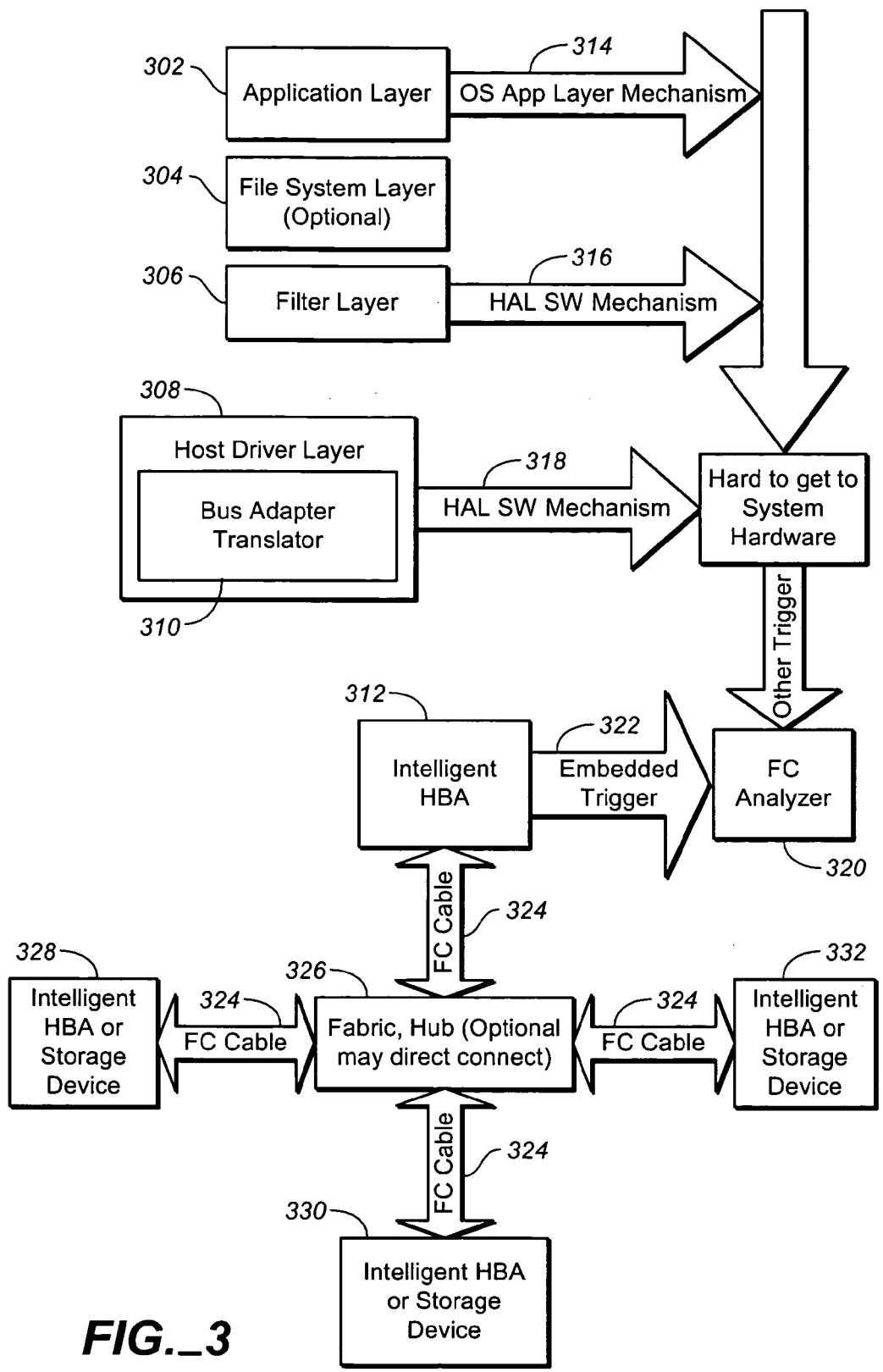
FIG._3

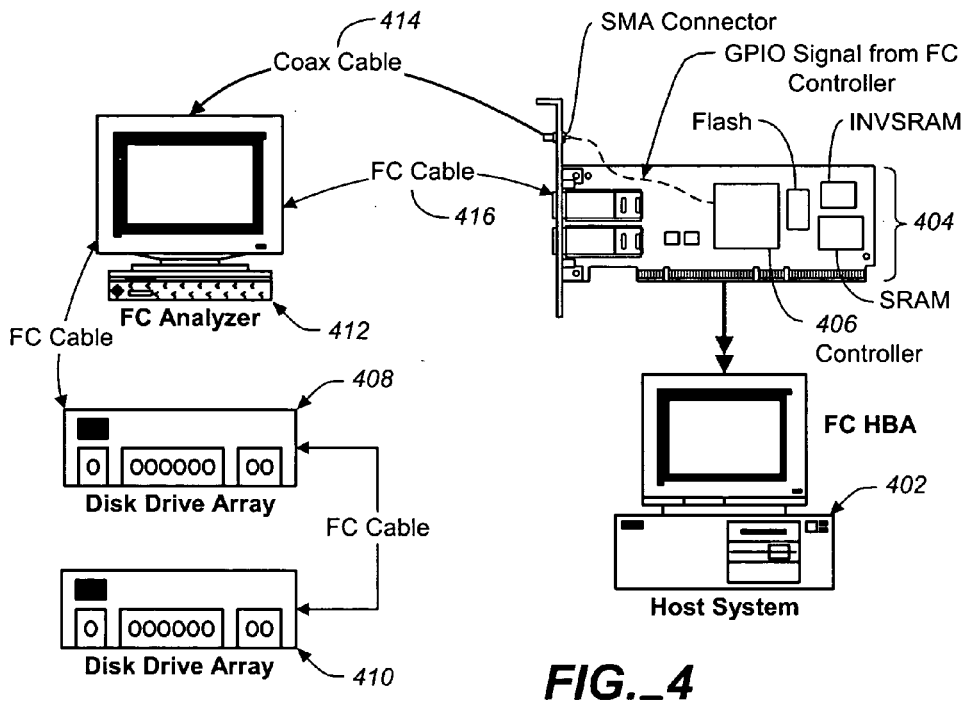
FIG._4
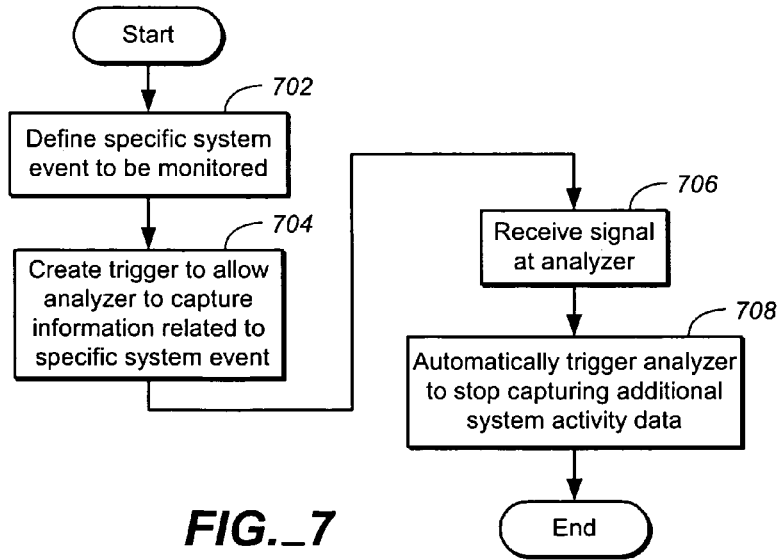
FIG._7

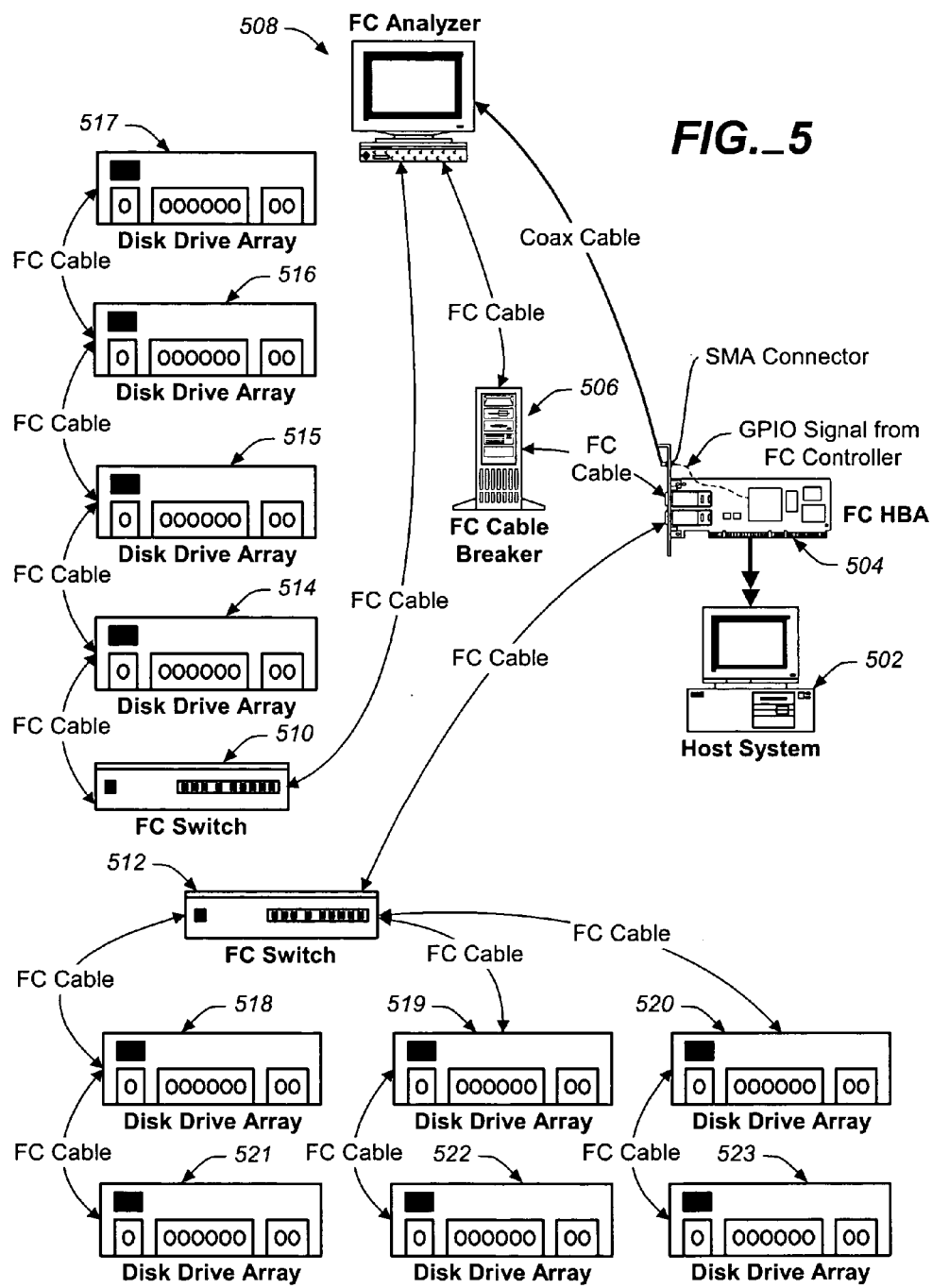
FIG._5

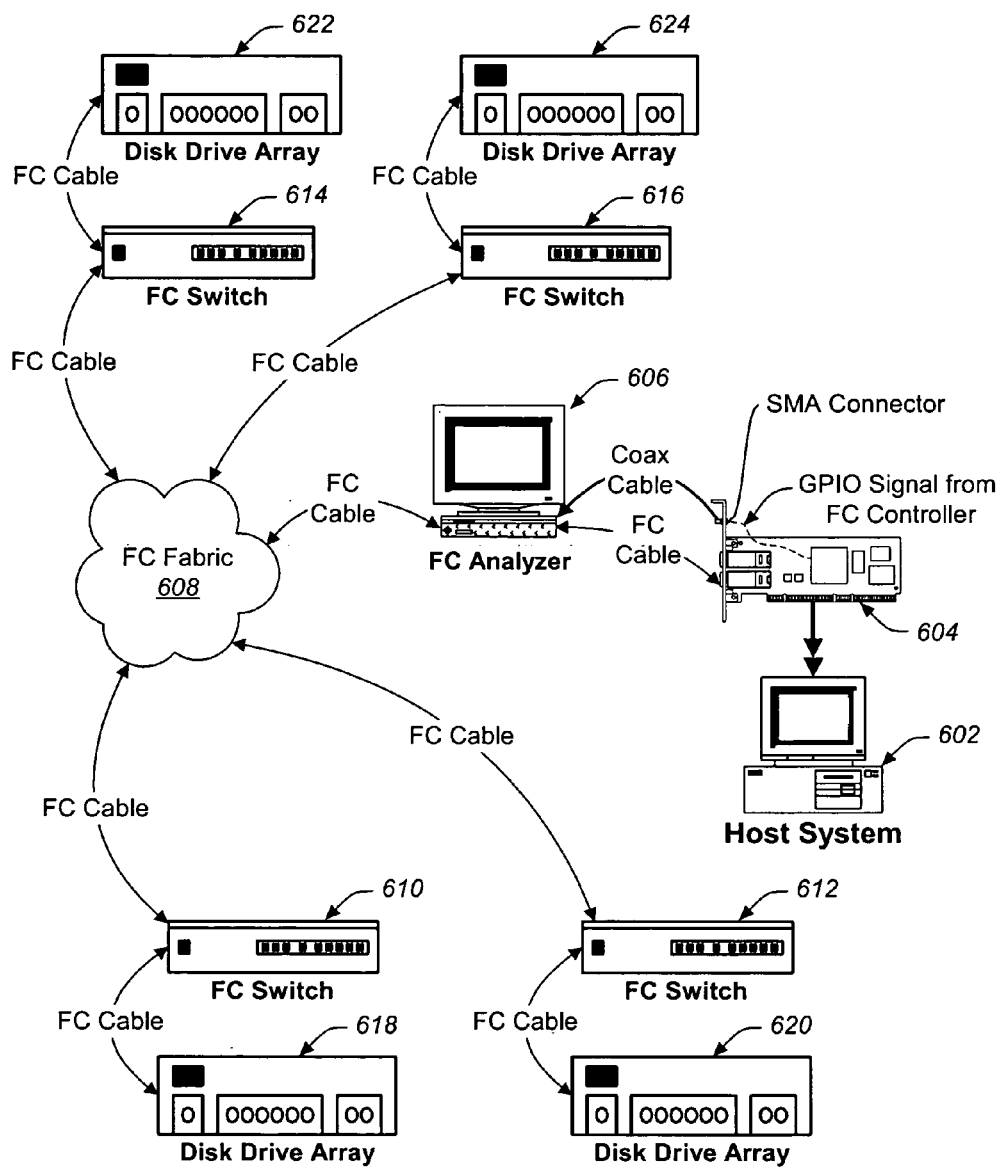
FIG._6

METHOD TO PROVIDE EXTERNAL OBSERVABILITY WHEN EMBEDDED FIRMWARE DETECTS PREDEFINED CONDITIONS

BACKGROUND OF THE INVENTION

1. Technical Field

The present invention is directed generally toward an improved data capturing system. More particularly, the present invention relates to a method and apparatus for generating a system specific test by providing a sophisticated programmable triggering mechanism to trigger on a specific system event.

2. Description of the Related Art

The current state of the electronics is one where devices must work reliably for long periods of time, even in adverse environments. In order to ensure such reliability, devices are subject to hours or even days of testing under extremely adverse conditions well beyond that which would be seen in an end user's environment. However, testing may uncover bugs in the system that are difficult to analyze, even with state of the art equipment. In such cases, having an intelligent debugging mechanism is essential to be able to examine system errors.

Triggering mechanisms are used to assist in analyzing network traffic and capturing information to detect a specific problem area. In particular, sophisticated triggering mechanisms are important to have when working with communications or storage integrated circuits (ICs) and host bus adapters (HBAs). System devices may be tested by changing voltages and/or temperatures, injecting errors into the communications media, disconnecting and reconnecting devices, dynamically changing configurations, and multiple other conditions. Components of the system, such as the communications link, embedded processors, and random access memory (RAM), are expected to detect and correct errors without causing system errors under these test conditions. This 'detect and correct' testing process may be performed continuously for hours or days.

Present off-the-shelf devices often contain moderately sophisticated trigger mechanisms intended to provide the user with sufficient logic to collect a limited amount of information close to the event in question. Unfortunately, these trigger mechanisms fall short of real-world application requirements in situations where the trigger event occurs significantly after the error event or if an error event matching externally observable trigger mechanisms is unknown or unavailable. As a result, the information gathered may fall short of the amount of information needed to properly analyze the event. For example, when nearing the completion of a particular test cycle, the system under test often does not fail for hours or days after the start of the test, even under extreme test conditions. In fact, the system often may operate well past the point of error, overrunning the buffers of present off-the-shelf devices. In other words, critical data may be lost if the trigger event for the error occurs at a time well after the occurrence of the event.

Furthermore, in a Fibre Channel-based system, a typical Fibre Channel (FC) analyzer may be used as a debug tool by providing multi-level triggering and filtering of FC packets to monitor and record all system activity. The recording may be played back and the activity information analyzed. Because these mechanisms operate in real time with information transferred bi-directionally at hundreds of megabytes per second, they are necessarily precious and expensive to obtain. It is not uncommon to require a test associate to sit by the system, wait until the failure occurs, and then manually stop the analyzer in order to gather critical data. The process could take a day to a week to be successful. Such a process results in countless man-hours being used to obtain a good trace from the analyzer, so that the event in question may be analyzed.

Thus, it would be advantageous to have a method and apparatus for generating a system specific test by providing sophisticated error tracking mechanisms to trigger on a specific event. It would further be advantageous to have a method and apparatus for preserving useful information for debugging purposes by using the intelligent triggering mechanism to terminate the storing of additional system activity information.

SUMMARY OF THE INVENTION

The present invention addresses the problem of monitoring network (i.e. SAN, Bus or IP network) traffic and isolating a point of error at the testing stage. The present invention provides a method and apparatus for generating a system specific test by providing sophisticated error tracking mechanisms to trigger on a specific system event. The present invention defines a specific system event to be monitored. A trigger signal is created by the system under test and routed to the analyzer, wherein the trigger is used to allow the analyzer to capture information related to the specific system event. When a signal is received at the analyzer, the signal automatically triggers the analyzer to capture and store a predetermined amount of data related to the specific system event before and after the trigger is executed.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a pictorial representation of a data processing system in which the present invention may be implemented in accordance with a preferred embodiment of the present invention;

FIG. 2 is a block diagram illustrating a data processing system in which the present invention may be implemented;

FIG. 3 is a block diagram illustrating the software layers associated with the present invention in accordance with a preferred embodiment of the present invention;

FIG. 4 is a diagram of a fibre channel system configuration in accordance with a preferred embodiment of the present invention;

FIG. 5 is a diagram of a fibre channel system configuration with a cable breaker added in line with an FC cable in accordance with the present invention;

FIG. 6 is a diagram of a fibre channel system fabric configuration with an analyzer in line with an FC cable in accordance with the present invention; and FIG. 7 is a flowchart of the process of generating a system specific test by providing sophisticated error tracking mechanisms to trigger on a specific system event in accordance with a preferred embodiment of the present invention.

DETAILED DESCRIPTION

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. Host bus adapter 212 provides a connection for hard disk drive 226, tape drive 228, CD-ROM drive 230 and other devices not pictured like FC hubs, FC switches and FC fabrics. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc.

Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 may be a symmetric multiprocessor (SMP) system including a plurality of processors 202 and 204 connected to system bus 206. Alternatively, a single processor system may be employed. The processes of the present invention are performed by processor or processors 202 using computer implemented instructions, which may be located in a memory such as, for example, main memory 204, memory 224, or in one or more peripheral devices 226-230.

The present invention provides a method and apparatus for utilizing the processors and/or memory of a system under test to trigger on a specific system event in order to significantly decrease the time necessary to debug a system error. In a preferred embodiment, the present invention is implemented in a Fibre Channel, SAS or SCSI system. Testing the error handling capabilities of fibre channel firmware includes using automated tools such as lippers, cable breakers, and power cyclers. These tools allow test associates to run tests for long periods of time without intervention. However, it still may be difficult to analyze error data during system testing, even though current systems may have large trace memory. If the trigger event occurs at a time significantly after the error occurs, the circular data buffers in the analyzer may be overrun with system activity data occurring well after and of no relevance to the error at issue.

The present invention overcomes this problem by providing a sophisticated programmable tracking mechanism to trigger on a specific system event. As a result, debugging a particular issue that takes a number of hours to reproduce becomes simpler. Employing a host bus adapter to trigger on a specific event provides the capability to stop the analyzer from gathering additional system activity information, thus preserving the useful information for debug purposes. The present invention eliminates the need for a test associate to sit by the system until the failure occurs and manually stop the analyzer. Since internal states of the firmware are not necessarily observable in a reasonable amount of time or may be misinterpreted by the OS driver layers, using the host bus adapter to trigger on a specific event significantly decreases the man-hours that a test associate must spend in debugging the failure issue.

Turning now to FIG. 3, a block diagram illustrating software layers associated with the present invention is depicted in accordance with a preferred embodiment of the present invention. Application layer 302, optional file system layer 304, filter layer 306, host driver layer 308, bus adapter translator 310, and intelligent HBA 312 are located within a host system, such as data processing system 200 shown in FIG. 2. Application layer 302, filter layer 306, and host driver layer 308 each contain a trigger mechanism 314, 316, 318 that prompts FC analyzer 320 to collect information regarding an event in question. Intelligent HBA 312 also contains a trigger mechanism, embedded trigger 322, which prompts FC analyzer 320 to collect information regarding an event in question.

Intelligent HBA 312 may be connected to fabric 326 via optical cable 324, which comprises hardware that connects servers or workstations, such as data processing system 200, to storage devices, such as storage devices 328, 330, 332, in a storage area network, or SAN. SAN fabric 326 enables any-server-to-any-storage device connectivity through the use of Fibre Channel switching technology.

Although the present invention may be implemented using any one of the layers shown in FIG. 3, in the preferred embodiment, the present invention is implemented using intelligent HBA layer 312. Intelligent HBA layer 312 provides more information regarding when an error occurs and more control in observing the error in comparison with the other layers. For example, although bus adapter translator 310 is generally wrapped by host driver layer and has access and knowledge of the mechanisms in the HBA, bus adapter translator 310 may not have observability into the information needed to trigger. Host driver layer 308, filter driver layer 306, and file system layer 304 are not readily modifiable. Application layer 302 contains the least amount of information regarding when an error occurs, and thus is not a good candidate for timely triggers.

Turning now to FIG. 4, a diagram of a simple fibre channel system configuration is depicted in accordance with a preferred embodiment of the present invention. The fibre channel system configuration includes host system 402, fibre channel (FC) host bus adapter 404 within host system 402, fibre channel (FC) analyzer 412, and two disk drive arrays 408 and 410. Host system 402 is an example of a computer, such as computer 100 in FIG. 1.

Fibre channel host bus adapter 404 is an example of a host bus adapter, such as host bus adapter 212 shown in FIG. 2, and is installed within host system 402. Although host bus adapter architectures may vary, a typical host bus adapter includes an on-board processor, a buffer memory to maintain data flow, and a protocol controller ASIC, such as controller 406. FC host bus adapter 404 may be connected to the other devices, such as disk drive arrays 408 and 410 and FC analyzer 412, using fibre channel cables. FC host bus adapter 404 is also connected to FC analyzer 412 using coaxial cable 414. General purpose input/output (GPIO) or other output controllable by the HBA is used to generate a signal from controller 406 that is sent to FC analyzer 412 via coaxial cable 414. A GPIO is a device within the HBA's main chip that may be programmed by the firmware or host to generate or sample digital signals.

FC analyzer 412 is used in debugging failure events in the fibre channel firmware. Limited information regarding a failure event may be obtained from the operating system, but the main source of information is obtained from the FC analyzer. FC analyzer 412 is connected in line between host system 402 and the next device in the configuration. For example, the next device in the configuration may be disk drive array 408 as shown in FIG. 4. A circular buffer is contained within FC analyzer 412 and is used to store system activity information occurring between FC host bus adapter 404 and other devices, such as disk drive arrays 408 and 410.

In a common test configuration, host system 402 may also contain a cable breaker board, which is used to electronically or physically stop the FC or other communications data transfer. FC optical cable 416 is used to transmit the signal output from host system 404 to the cable breaker board and from the cable breaker board to a particular device, be it a hub, disk drive array or a fabric. The cable breaker board may also be housed external to host system 404, such as within FC cable breaker 506 shown in FIG. 5. The function of the cable breaker board is similar to disconnecting FC optical cable 416 from FC host bus adapter 404. The cable breaker board continues to "break" the cable until a test associate manually turns the cable breaking functionality off. Although this functionality allows stress tests to run for long periods of time without user intervention, when a failure occurs and the stress test stops, the cable breaker board continues to "break" the cable. As a result, it may be very difficult to obtain information concerning the failure.

Furthermore, trigger functionality in conventional FC analyzers is limited in that there is only a generalized set of options, none of which provide assistance in resolving the continuing cable breaking scenario described above. In addition, FC analyzer 412 may contain a circular buffer or a first in first out (FIFO) buffer which has a limited amount of space to store data. As a result, new data will overwrite old data. In other words, when the failure occurs but the cable breaker continues to "break" the cable, the critical data needed to analyze the failure is eventually overwritten by new information due to the circular buffer.

In the present invention, FC analyzer 412 sets up a trigger to terminate the storing of additional system activity information. The trigger is configured to allow the analyzer to capture a predetermined amount of data before and after the trigger is executed. Traditional trigger mechanisms may provide a user with sufficient logic to collect a limited amount of information close to the event in question. However, in situations where the trigger event occurs significantly after the error event, the information gathered may fall short of the amount of information needed to properly analyze the event. For example, a system under test often does not fail for hours or days after the start of the test and may often operate well past the point of error, thus overrunning the buffers in FC analyzer 412. The present invention prevents the loss of critical data, which may, in traditional systems, be lost if the trigger event for the error occurs at a time well after the occurrence of the event. By setting up this FC analyzer configuration, a test associate may designate the amount of circular memory is to be retained before and after the trigger. The triggering mechanism in FC analyzer 412 may be controlled by host system 402, storage devices, or any peer communications device in the system.

For example, an intelligent controller that maps devices logically, such as FC host bus adapter 404, knows the status of all connected devices. The intelligent controller may provide an output on one of its programmable output pins or other debug ports to trigger FC analyzer 412 within a relatively small amount of time (milliseconds or seconds) of when the failure event occurs. This method may be extended to provide for multiple separate sophisticated triggering mechanisms limited by the number of available programmable pins. Each output pin could also be programmed with separate triggering mechanisms. Such mechanisms may include, for example, detection of too many errors from a given device, the device going away, link exceptions, illegal device activity, input/output (IO) (exchange or sequence) status, among others. One recently requested trigger function is to toggle a chip pin signal (GPIO) when a CRC or bad frame is detected in order to debug bad data being caused by external devices and bad layout problems with high speed connections.

FIGS. 5 and 6 illustrate differing complexities of example environments in which the present invention may be implemented. For example, FIG. 5 is a diagram of a fibre channel system configuration with a cable breaker added in line with an FC cable in accordance with the present invention. As mentioned above, the cable breaker board may be located within the host system, such as within host system 502, or external to the host system, such as within FC cable breaker 506. FC cable breaker 506 may be added to the configuration in line with the FC cable. The cable breaker board housed within FC cable breaker 506 is used to electronically disconnect the FC optical cable 516 signal output from FC host bus adapter 504 in host system 502 to a particular device. Switches, such as FC switches 510 and 512, may be used to channel incoming data from host system 502 or FC analyzer 508 to any of disk drive arrays 514–517 or 518–523, respectively. If a fabric or intelligent hub is in the system, out of band management protocols such as TCPIP may be used to turn ports on or off within the fabric or hub in order to provide close to the same affect as using a cable breaker.

FIG. 6 is a diagram of a fibre channel fabric configuration with an analyzer in line with an FC cable in which the present invention may be implemented. This configuration employs fabric 608, which comprises hardware that connects workstations and servers to storage devices in a storage area network, or SAN. SAN fabric 608 enables any-server-to-any-storage device connectivity through the use of Fibre Channel switching technology.

As mentioned above, FC host bus adapter 604 within host system 602 sends a GPIO signal to FC analyzer 606. The triggering mechanism in FC analyzer 606 may be controlled by host system 602, storage devices, such as FC switches 610, 612, 614, and 616, and FC fabric, such as FC fabric 608, or any peer communications device in the system. FC switches 610, 612, 614, and 616 may be used to channel incoming data from host system 602 or FC analyzer 606 to disk drive arrays 618, 620, 622, and 624, respectively. A FC cable breaker may also be added in line between FC analyzer 606 and fabric 608.

Turning now to FIG. 7, a flowchart of the process for enabling a sophisticated programmable tracking mechanism to trigger on a specific system event is depicted in accordance with a preferred embodiment of the present invention. The process begins with defining the specific system event to be monitored (step 702). Next, a trigger is created to allow the analyzer to capture information related to the specific event (step 704). The trigger is configured to allow the analyzer to capture a predetermined amount of data before and after the trigger is executed. When a signal is received from the host bus adapter, storage devices, or other peer communications devices in the system (step 706), the signal is used to automatically trigger the analyzer to stop capturing data after a predetermined period (step 708). As a result, the analyzer will be stopped from capturing any additional system activity data, so that information related to the specific event will be available limited space in the circular buffer to be analyzed.

With the present invention, the disadvantages of the known data capturing systems are avoided by providing a sophisticated programmable tracking mechanism to trigger on a specific system event. The advantages of the present invention should be apparent in view of the detailed description provided above. Employing a host bus adapter to trigger on a specific event provides the capability to stop the analyzer from gathering additional system activity information, thus preserving the useful information for debug purposes. The present invention eliminates the need for a test associate to sit by the system until the failure occurs and manually stop the analyzer. Using the host bus adapter to trigger on a specific event significantly decreases the man-hours that a test associate must spend in debugging the failure issue.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

What is claimed is:

1. A method for testing the error handling capabilities of a system's firmware by allowing an analyzer to trigger on a specific system event, comprising:

defining a specific system event to be monitored;

creating a trigger configured to allow an analyzer to capture information related to the specific system event, wherein the trigger is controlled by an intelligent triggering controller external to the analyzer; and receiving a signal at the analyzer from the intelligent triggering controller, wherein the signal automatically triggers the analyzer to capture and store a predetermined amount of data related to the specific system event before and after the trigger is executed.

2. The method of claim 1, wherein the intelligent triggering controller is one of a host system, a storage device, or a peer communications device.

3. The method of claim 2, wherein the intelligent triggering controller is a fibre channel host bus adapter in the host system.

4. The method of claim 1, wherein the analyzer is triggered within a millisecond of when the specific system event occurs.

5. The method of claim 3, wherein the fibre channel host bus adapter in the host system maps all connected devices logically to determine status conditions of the connected devices.

6. The method of claim 1, wherein the intelligent triggering controller controls the trigger in the analyzer to capture and store data regarding internal states of the system's firmware.

7. The method of claim 2, wherein the storage device includes initiators, targets, switches, or fabrics.

8. The method of claim 3, wherein the fibre channel host bus adapter includes a number of output pins, and wherein each output pin may be programmed with a separate triggering mechanism.

9. The method of claim 8, wherein the separate triggering mechanisms include detection of device errors above a certain threshold, device going away, illegal device activity, and input/output status.

10. A data processing system for testing the error handling capabilities of a system's firmware by allowing an analyzer to trigger on a specific system event, comprising:
defining means for defining a specific system event to be monitored;
creating means for creating a trigger configured to allow an analyzer to capture information related to the specific system event, wherein the trigger is controlled by an intelligent triggering controller external to the analyzer; and
receiving means for receiving a signal at the analyzer from the intelligent triggering controller, wherein the signal automatically triggers the analyzer to capture and store a predetermined amount of data related to the specific system event before and after the trigger is executed.

11. The data processing system of claim 10, wherein the intelligent triggering controller is one of a host system, a storage device, or a peer communications device.

12. The data processing system of claim 11, wherein the intelligent triggering controller is a fibre channel host bus adapter in the host system.

13. The data processing system of claim 10, wherein the analyzer is triggered within a millisecond of when the specific system event occurs.

14. The data processing system of claim 12, wherein the fibre channel host bus adapter in the host system maps all connected devices logically to determine status conditions of the connected devices.

15. The data processing system of claim 10, wherein the intelligent triggering controller controls the trigger in the analyzer to capture and store data regarding internal states of the system's firmware.

16. The data processing system of claim 11, wherein the storage device includes initiators, targets, switches, or fabrics.

17. The data processing system of claim 12, wherein the fibre channel host bus adapter includes a number of output pins, and wherein each output pin may be programmed with a separate triggering mechanism.

18. The data processing system of claim 17, wherein the separate triggering mechanisms include detection of device errors above a certain threshold, device going away, illegal device activity, and input/output status.

19. A computer program product in a computer readable medium for testing the error handling capabilities of a system's firmware by allowing an analyzer to trigger on a specific system event, comprising:
first instructions for defining a specific system event to be monitored;
second instructions for creating a trigger configured to allow an analyzer to capture information related to the specific system event, wherein the trigger is controlled by an intelligent triggering controller external to the analyzer; and
third instructions for receiving a signal at the analyzer, wherein the signal automatically triggers the analyzer to capture and store a predetermined amount of data related to the specific system event before and after the trigger is executed.

20. The computer program product of claim 19, wherein the intelligent triggering controller is one of a host system, a storage device, or a peer communications device.

21. The computer program product of claim 20, wherein the intelligent triggering controller is a fibre channel host bus adapter in the host system.

22. The computer program product of claim 19, wherein the analyzer is triggered within a millisecond of when the specific system event occurs.

23. The computer program product of claim 21, wherein the fibre channel host bus adapter in the host system maps all connected devices logically to determine status conditions of the connected devices.

24. The computer program product of claim 19, wherein the intelligent triggering controller controls the trigger in the analyzer to capture and store data regarding internal states of the system's firmware.

25. The computer program product of claim 20, wherein the storage device includes initiators, targets, switches, or fabrics.

26. The computer program product of claim 21, wherein the fibre channel host bus adapter includes a number of output pins, and wherein each output pin may be programmed with a separate triggering mechanism.

27. The computer program product of claim 26, wherein the separate triggering mechanisms include detection of device errors above a certain threshold, device going away, illegal device activity, and input/output status.

* * * * *